United States Patent [19]
Lin

[11] Patent Number: 6,108,198
[45] Date of Patent: Aug. 22, 2000

[54] MODULAR COMPUTER DEVICE

[75] Inventor: Cheng-Jen Lin, Hsinchu, Taiwan

[73] Assignee: Mitac International Corp., Hsinchu, Taiwan

[21] Appl. No.: 09/156,435

[22] Filed: Sep. 18, 1998

[30] Foreign Application Priority Data

Sep. 19, 1997 [TW] Taiwan .................................. 86216004

[51] Int. Cl.$^7$ .............................. H05K 5/00; H05K 7/20; H05K 5/04; H05K 1/18; H01R 9/09; A47B 81/00; A47B 97/00

[52] U.S. Cl. ......................... 361/683; 361/683; 361/715; 361/716; 361/719; 361/724; 361/730; 361/788; 439/61; 312/223.1; 312/223.3

[58] Field of Search .............................. 439/61; 361/715, 361/716, 724, 683, 719, 730, 788; 312/223.1, 223.3

[56] References Cited

U.S. PATENT DOCUMENTS

| | | | |
|---|---|---|---|
| 4,941,841 | 7/1990 | Darden et al. | 439/377 |
| 5,680,295 | 10/1997 | Le et al. | 361/695 |
| 5,740,020 | 4/1998 | Palatov | 361/796 |
| 5,967,633 | 10/1999 | Jung | 312/223.2 |
| 5,995,376 | 11/1999 | Schultz et al. | 361/788 |

Primary Examiner—Leo P. Picard
Assistant Examiner—Tung Minh Bui
Attorney, Agent, or Firm—Ladas & Parry

[57] ABSTRACT

The computer housing of a modular computer device includes a rectangular housing body-having a front panel formed with at least one module receiving opening, a side door mounted pivotally on the housing body and operable so as to close and open an open lateral side of the housing body, and a connector unit disposed in the housing body and having at least one electrical connecting set registered with a corresponding module receiving opening. A computer main board is mounted on an inner surface of the side door and is connected electrically to the connector unit. At least one computer peripheral module has a module housing that is disposed slidably and removably in a corresponding module receiving opening and that has a rear side provided with a module connector set. The module connector set engages mechanically and electrically an aligned corresponding electrical connecting set of the connector unit to establish electrical connection between the computer peripheral module and the computer main board.

7 Claims, 2 Drawing Sheets

MODULAR COMPUTER DEVICE

BACKGROUND OF THE INVENTION

1. Field of the Invention

The invention relates to a computer device., more particularly to a modular computer device that can be easily assembled by the user to meet a user-defined specification.

2. Description of the Related Art

The rapid growth in computer technology has made computers and their peripheral devices affordable for most people. As a matter of fact, it is expected that almost everyone will own a personal computer in the next century. However, the assembly of a computer device is currently a big problem for manufacturers, distributors, retailers, etc. In current computer devices, the housing thereof must be disassembled to replace a computer main board or upgrade a memory module or a central processing unit on the mainboard. Moreover, screwdrivers are needed when installing or removing peripheral devices, such as hard disk drives, CD-ROM drives, etc. Connection and disconnection of the power and signal cables of the peripheral devices to and from the main board are also inconvenient to conduct due to the crowded space inside the housing.

SUMMARY OF THE INVENTION

The object of the present invention is to provide a modular computer device that can be easily assembled by the user to meet a user-defined specification.

More particularly, the object of the present invention is to provide a modular computer device that utilizes computer peripheral modules, which can be mounted on and removed from a computer housing without the need for screwdrivers and which obviates the need for the user to employ cables for connecting the computer peripheral modules to a computer main board.

According to the present invention, a modular computer device comprises a computer housing that includes a rectangular housing body having a front panel formed with at least one module receiving opening A side door is mounted pivotally on the housing body and is operable so as to close and open an open lateral side of the housing body. A connector unit is disposed in the housing body and has at least one electrical connecting set registered with a corresponding module receiving opening.

In the preferred embodiment, the connector unit includes an upright casing mounted inside the housing body such that the casing is parallel to and is spaced apart from the front panel. The casing has a circuit board disposed therein, and the electrical connecting set is mounted on the circuit board and extends out of the casing toward the corresponding module receiving opening. A computer main board is mounted on an inner surface of the side door and is connected electrically to the connector unit. At least one computer peripheral module has a module housing that is disposed slidably and removably in a corresponding module receiving opening and that has a rear side provided with a module connector set. The module connector set engages mechanically and electrically an aligned corresponding electrical connecting set of the connector unit to establish electrical connection between the computer peripheral module and the computer main board.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
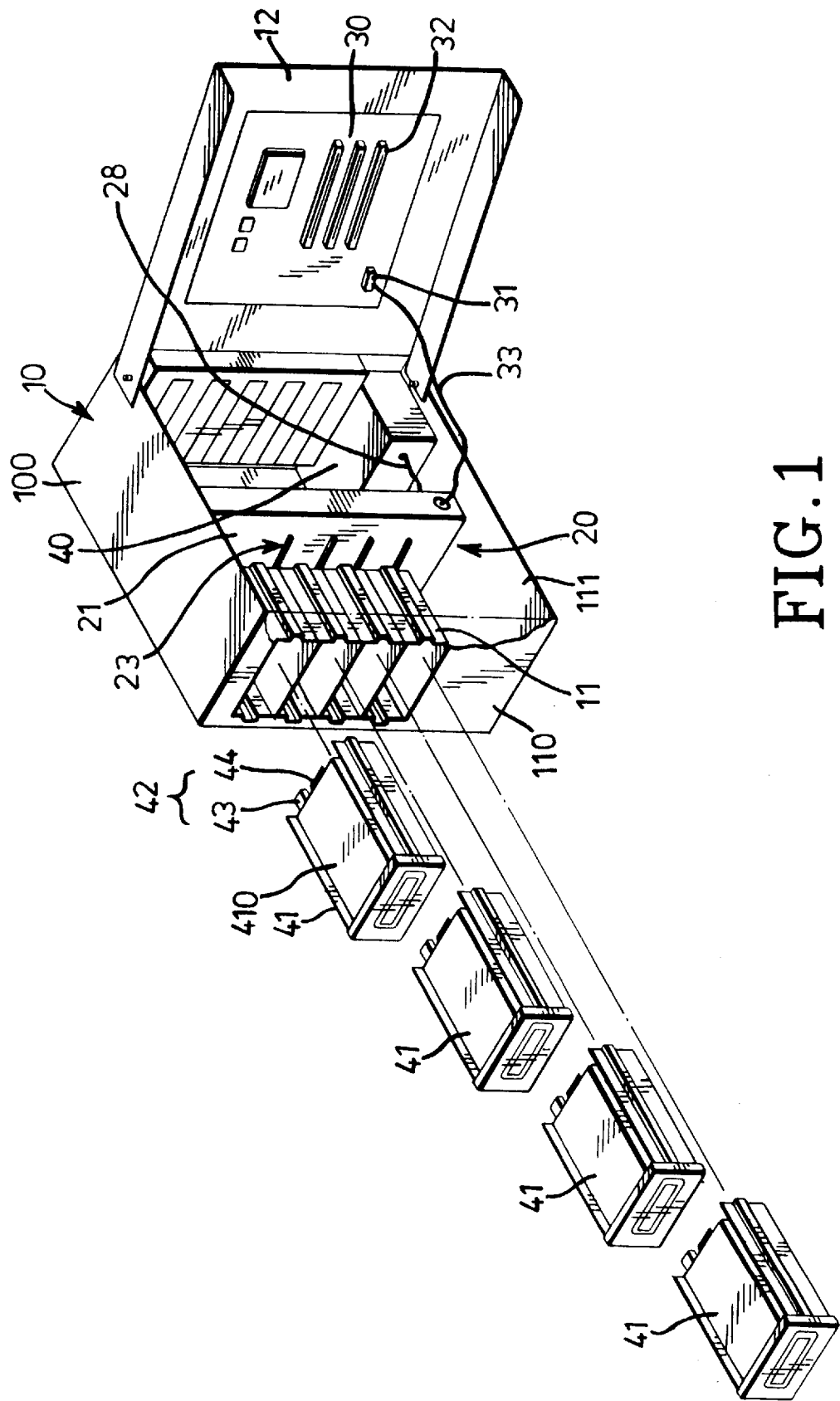
FIG. 1 is a partly exploded view of the preferred embodiment of a modular computer device according to the present invention.
Figure 2:
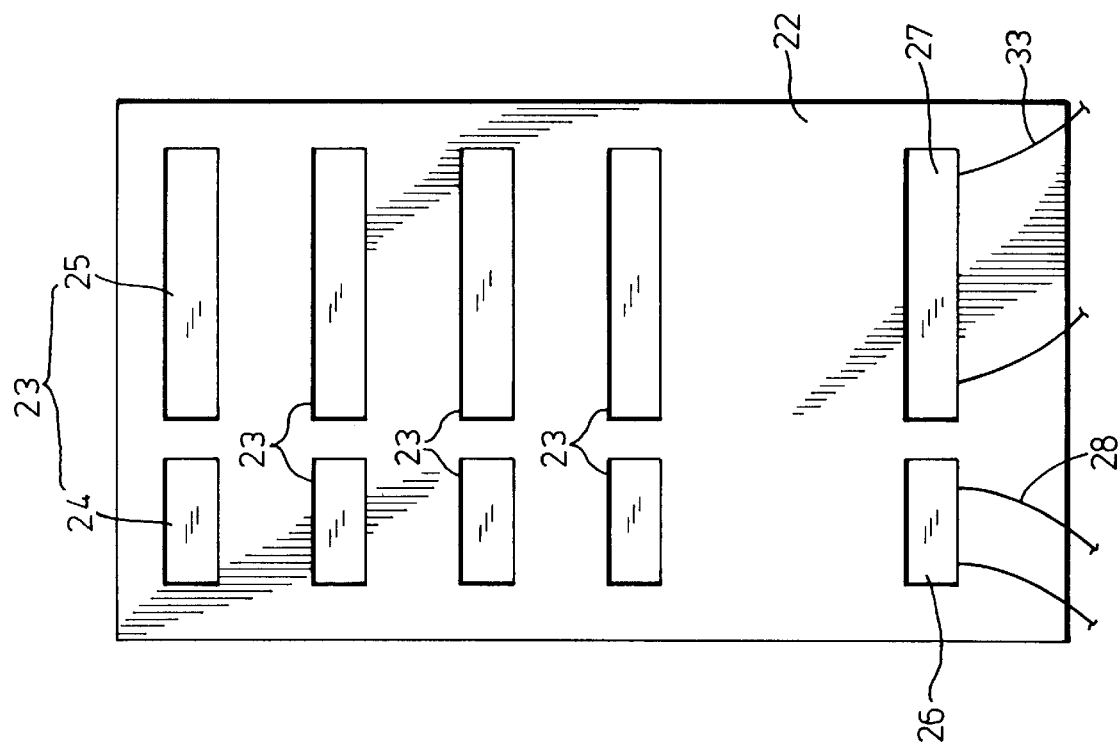
FIG. 2 is a schematic view illustrating a circuit board and electrical connecting sets of a connector unit of the preferred embodiment.

Referring to FIGS. 1 and 2, the preferred embodiment of a modular computer device according to the present invention is shown to comprise a computer housing 10, a computer main board 30, a power supplying unit 40, and at least one computer peripheral module 41. There are four computer peripheral modules 41 in the preferred embodiment.

The computer housing 10 includes an upright rectangular housing body 100 having a front panel 110 formed with at least one module receiving opening 11. In this embodiment, the front panel 110 is formed with four module receiving openings 11. The housing body 100 has an open lateral side 111. A side door 12 is mounted pivotally on a rear part of the housing body 100 and is pivotable about a vertical axis. The side door 12 is operable so as to close and open the open lateral side 111 of the housing body 100.

The computer housing 10 further includes a connector unit 20 disposed inside the housing body 100. In the preferred embodiment, the connector unit 20 includes an upright casing 21 mounted inside the housing body 100 such that the casing 21 is parallel to and is spaced apart from the front panel 110. The casing 21 has a circuit board 22 (see FIG. 2) disposed therein. At least one electrical connecting set, 23 is mounted on the circuit board 22 and extends out of the casing 21. In this embodiment, there are four electrical connecting sets 23, each of which extends out of the casing 21 toward a respective registered one of the module receiving openings 11 in the front panel 110. Each electrical connecting set 23 includes a first module power connector 24 and a first module signal connector 25. At the bottom portion of the circuit board 22, there is provided a main power connector 26 and a main signal connector 27. The main power connector 26 is connected electrically to the first module power connectors 24 of the electrical connecting set 23. The main signal connector 27 is connected electrically to the first module signal connectors 25 of the electrical connecting set 23.

The main board 30 is mounted on an inner surface of the side door 12. The main board 30 is a standard computer motherboard, and is provided with a board signal connector 31 and expansion slots 32. The board signal connector 31 and the main signal connector 27 of the connector unit 20 are interconnected by a signal cable 33 that complies with the IEEE 1394 and USB interface standards.

The power supplying unit 40 is disposed in the housing body 100 and is connected electrically to the main power connector 26 of the connector unit 20 via a power cable 28.

Each of the computer peripheral modules 41 can be one of a floppy disk drive, a hard disk drive, a tape machine, and a CD-ROM drive. Each computer peripheral module 41 has a module housing 410 that is disposed slidably and removably in a corresponding one of the module receiving openings 11. Preferably, the module housing 410 and the corresponding module receiving opening 11 are formed with a tongue-and-groove unit for slidable retention of the module housing 410 in the corresponding module receiving opening 11. The module housing 410 has a rear side provided with a module connector set 42 that includes a second module power connector 43 and a second module signal connector 44. The connectors 43, 44 engage mechanically and electrically the connectors 24, 25 of an aligned one of the electrical connecting sets 23 of the connector unit 20. As such, electrical connection between the computer peripheral modules 41 and the main board 30 is accomplished via the connector unit 20.

It has thus been shown that the modular computer device of the present invention can be easily and conveniently assembled and upgraded by the user to meet a user-defined specification without the need for using a screwdriver or for installing power and signal cables to connect a computer peripheral module to the computer main board. The object of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A modular computer device comprising a computer housing that includes:

a rectangular housing body having a front panel formed with at least one module receiving opening, said housing body further having an open lateral side;

a side door mounted pivotally on said housing body and operable so as to close and open said open lateral side of said housing body; and a connector unit disposed in said housing body and having at least one electrical connecting set registered with a corresponding said module receiving opening, said connector unit including an upright casing mounted inside said housing body such that said casing is parallel to and is spaced apart from said front panel, said casing having a circuit board disposed therein, said electrical connecting set being mounted on said circuit board and extending out of said casing toward the corresponding said module receiving opening, said electrical connecting set including a first module power connector and a first module signal connector, said connector unit further including a main power connector and a main signal connector mounted on said circuit board, said main power connector being connected electrically to said first module power connector of said electrical connecting set, said main signal connector being connected electrically to said first module signal connector of said electrical connecting set.

2. The modular computer device as claimed in claim 1, further comprising a power supplying unit disposed in said housing body and connected electrically to said main power connector of said connector unit.

3. The modular computer device as claimed in claim 1, further comprising a computer main board mounted on an inner surface of said side door and connected electrically to said connector unit.

4. The modular computer device as claimed in claim 3, further comprising a signal cable that connects electrically said computer main board to said main signal connector of said connector unit and that complies with the IEEE 1394 and USB interface standards.

5. The modular computer device as claimed in claim 3, further comprising at least one computer peripheral module having a module housing that is disposed slidably and removably in a corresponding said module receiving opening and that has a rear side provided with a module connector set, said module connector set including a second module power connector and a second module signal connector that engage mechanically and electrically said first module power connector and said first module signal connector of an aligned corresponding said electrical connecting set of said connector unit to establish electrical connection between said computer peripheral module and said computer main board.

6. The modular computer device as claimed in claim 5, wherein said module housing and the corresponding said module receiving opening are formed with a tongue-and-groove unit for slidable retention of said module housing in the corresponding said module receiving opening.

7. The modular computer device as claimed in claim 6, wherein said computer peripheral module is one of a floppy disk drive, a hard disk drive, a tape machine, and a CD-ROM drive.

* * * * *